| United States Patent [19] | [11] 3,827,311 |
|---|---|
| Père | [45] Aug. 6, 1974 |

[54] OSCILLATABLE PINION

[75] Inventor: Gérard Père, Le Breuil, France

[73] Assignee: Creusot-Loire, Paris, France

[22] Filed: Sept. 11, 1972

[21] Appl. No.: 288,065

[30] Foreign Application Priority Data
Sept. 21, 1971  France .............................. 71.33851

[52] U.S. Cl............... 74/410, 184/6.12, 184/104 R
[51] Int. Cl. ...................... F16h 57/00, F16n 39/00
[58] Field of Search........... 74/410; 184/6.12, 104 R

[56] References Cited
UNITED STATES PATENTS

| 3,146,629 | 9/1954 | Schmitter.............................. 74/410 |
| 3,167,975 | 2/1965 | Durand............................. 74/410 X |
| 3,559,498 | 2/1971 | Narsted................................ 74/410 |
| 3,705,518 | 12/1972 | Ernst et al. .......................... 74/410 |

*Primary Examiner*—Manuel A. Antonakas
*Attorney, Agent, or Firm*—Cameron, Kerkam, Sutton, Stowell & Stowell

[57] ABSTRACT

An oscillatable pinion which has a pair of journals each reached by a half bearing, the half bearings being supported in a bearing body carried on a hinge pin whose axis is transverse to the axis of the bearing and perpendicular to the normal force of one of the gears in relation to the other.

2 Claims, 4 Drawing Figures

OSCILLATABLE PINION

The invention concerns a pinion which oscillates about a transverse shaft.

It is for driving a rotary element, when deviations from parallelism can occur between the shaft of the said element, on the one hand, and the shaft of the pinion, on the other hand. It can enable drive mechanisms to be constructed for rotary drums, for example grinders.

The parallelism of the mountings of drive mechanisms between two plain gears, one driving and one driven is very often defective. This defect may result from the initial mounting or from deformations of various origins. In this way, deformations (flexions) of bodies integral with the gears can result. From this results meshing on the gear tips, unilateral wear of the teeth, and impairment of the angles. The flexural stresses and pressure stresses of rolling on the teeth are considerably increased by this unilateral distribution of forces, which makes it necessary to over-dimension the pinions or toothed wheels.

There already exist mechanisms ensuring a continuous parallelism between the driving pinion and the driven gear. Thus, a known mechanism, described in French Pat. No. PV 141,825, concerns a mechanism in which, to ensure the parallelism between the theoretical axis of the driving pinion and the axis of the driven crown, the pinion is supported by two bearings comprising a deformable chamber fed with liquid under pressure, on which rests a slide in which the bearing is supported by means of a ball joint. This mechanism is, however, too complex for certain applications.

The disadvantage mentioned above is practically eliminated by the bearing according to the invention. This mechanism, of simple design, ensures that the gear teeth of the driving pinion bear correctly on the driven gear teeth.

According to the invention, the body of the bearing is supported by means of a hinged joint whose pin is perpendicular to the normal force of one of the gears relative to the other and to the shaft of the driven gear.

The invention will now be described, with more details, referring to a particular embodiment given as an example and shown on the annexed drawings.

Figure 1:
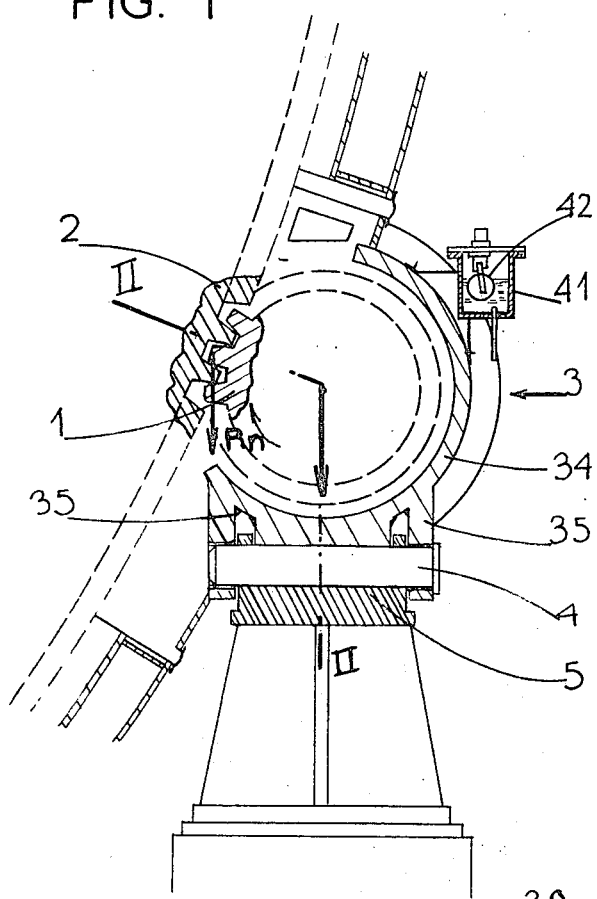
FIG. 1 is a right sectional view of the pinion and of the driven gear, through the joint pin of the mechanism.
Figure 2:
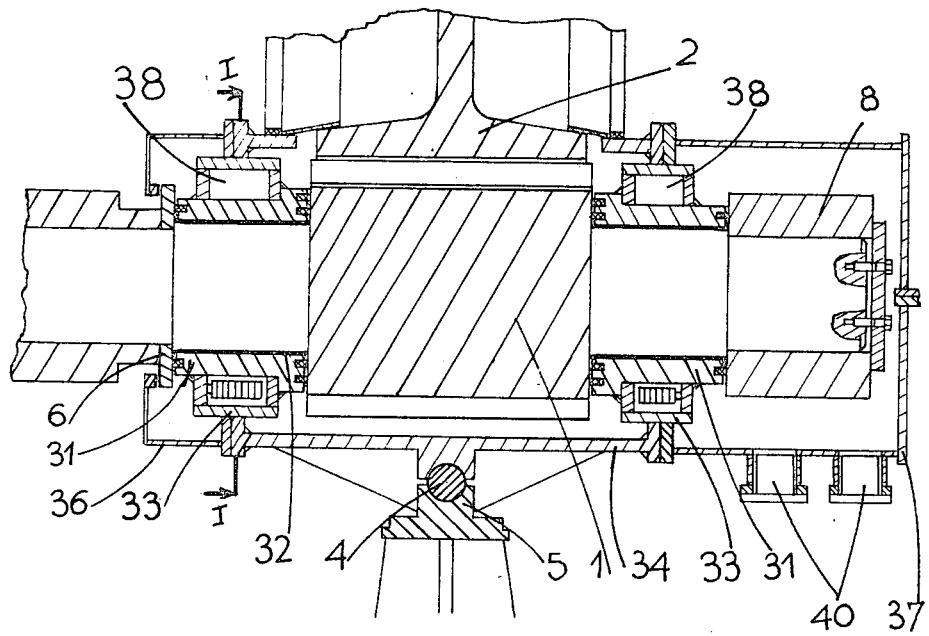
FIG. 2 is a sectional view along II—II of FIG. 1.

FIGS. 1 and 2 show a driving pinion 1 in mesh with a driven gear 2. The pinion is carried by a bearing with smooth bushings 3. This bearing comprises two annular cages 33, lateral relative to the pinion and connected by a side-plate 34; in the cages are located two bearing halves 31, lined internally with anti-friction linings 32. The bearings 3 comprises two arms 35 forming a yoke. In this yoke is mounted the head of a fixed bed-plate 5 traversed by a joint pin 4 which bears at its two ends the arms 35 of the bearing.

The joint pin 4, which makes possible small angular displacements of the bearing, is perpendicular, on the one hand, to the reaction Rn of the driven gear 2 on the driving pinion 1, normal to the flanks of the teeth and directed along the line of engagement, and, on the other hand, to the axis of rotation of the gear 2 and the pinion 1. A counter-weight 8 balances the weight of the drive elements fixed to the other extremity of the pinion. Because of this, the joint undergoes no appreciable axial force or torsional couple, and the contact between the teeth is permanently ensured.

Figure 3:
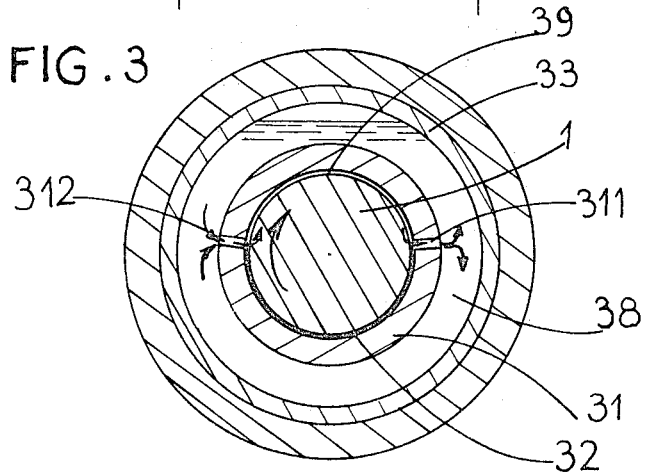
FIG. 3 is a sectional view along I—I of a bearing carrying the pinion.

FIG. 3 shows that the bearing halves 31 are surrounded by annular chambers 38 containing oil, arranged within the cages 33. The oil pockets such as 39, partially surrounding the journals of the pinion 1, have oil passing through them and flowing through two radial conduits 311 and 312 jointed to the lining 32 and communicating between the pockets 39 and the chambers 38.

Figure 4:
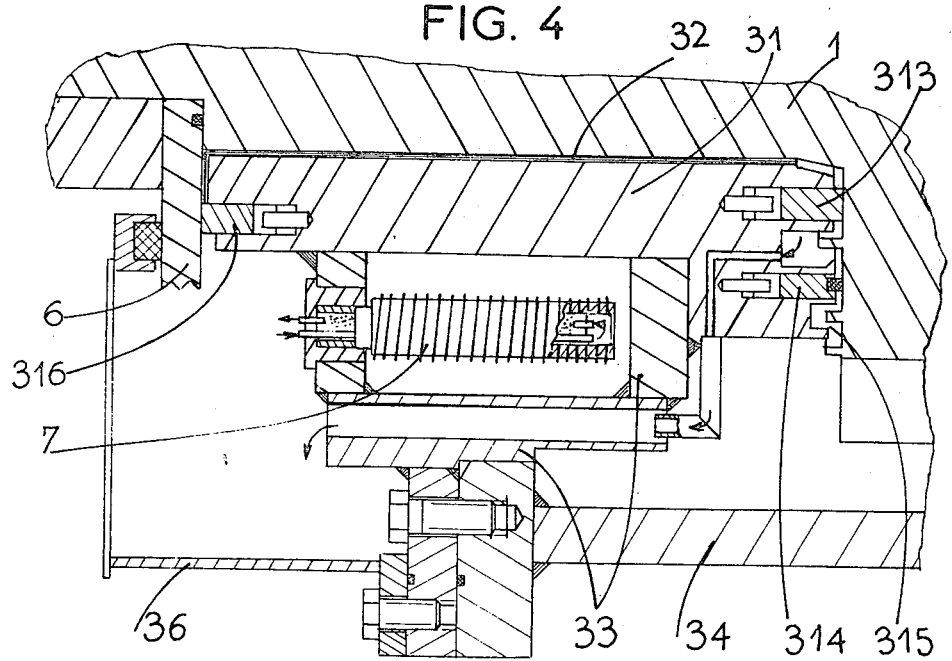
FIG. 4 is a detail view of a half bearing.

As shown on FIG. 4, the sealing of the bearing halves is ensured, on one side, by plain joints 313 and 314 rubbing on the shoulders of the pinion 1 and by deep labyrinth grooves 315, filled with grease; and on the other side of the bearing half by plane joints 316 rubbing against the thrust collar 6 and the counter-weight 8, which in addition ensure the lateral guiding on the pinion 1 by rubbing between the cheeks of the bearing halves 31. Leakages of oil are collected in the housings 36 and 37 and are taken up by pumps 40 to be returned to a reservoir 41 communicating with the oil chambers 38 and comprising a contact level 42 for control of the pumps 40.

The cooling of the bearing, or its heating, can be ensured by heat exchangers 7, immersed in the oil contained in the chambers 38.

It is to be understood that the system just described can be modified in its details without departing from the scope of the invention.

What we claim is:

1. A drive mechanism comprising an oscillatable driving pinion, a driven gear in mesh with said pinion, a bearing body for said pinion, a fixed bedplate, an articulation having a fixed axis of articulation supporting said body on said fixed bedplate, said fixed axis being perpendicular to the axis of said pinion and perpendicular to the normal force of said pinion in relation to said gear, a pin in said axis forming said articulation and means for preventing movement of said bearing body with respect to said bedplate in the direction of said axis of articulation.

2. A drive mechanism comprising an oscillatable driving pinion, a driven gear in mesh with said pinion, a bearing body for said pinion, a fixed bedplate, an articulation having a fixed axis of articulation supporting said body on said fixed bedplate, said fixed axis being perpendicular to the axis of said pinion and perpendicular to the normal force of said pinion in relation to said gear, a pin in said axis forming said articulation, means for preventing movement of said bearing body with respect to said bedplate in the direction of said articulation, journals for said pinion, a half bearing for each of said journals an oil pocket on that side of each of said journals transmitting load to the associated half bearing of the load and an annular oil chamber surrounding said half bearing communicating with said oil pocket by two radial conduits and heat exchangers in said body for the oil connected to said conduits.

* * * * *